Patented Aug. 6, 1940

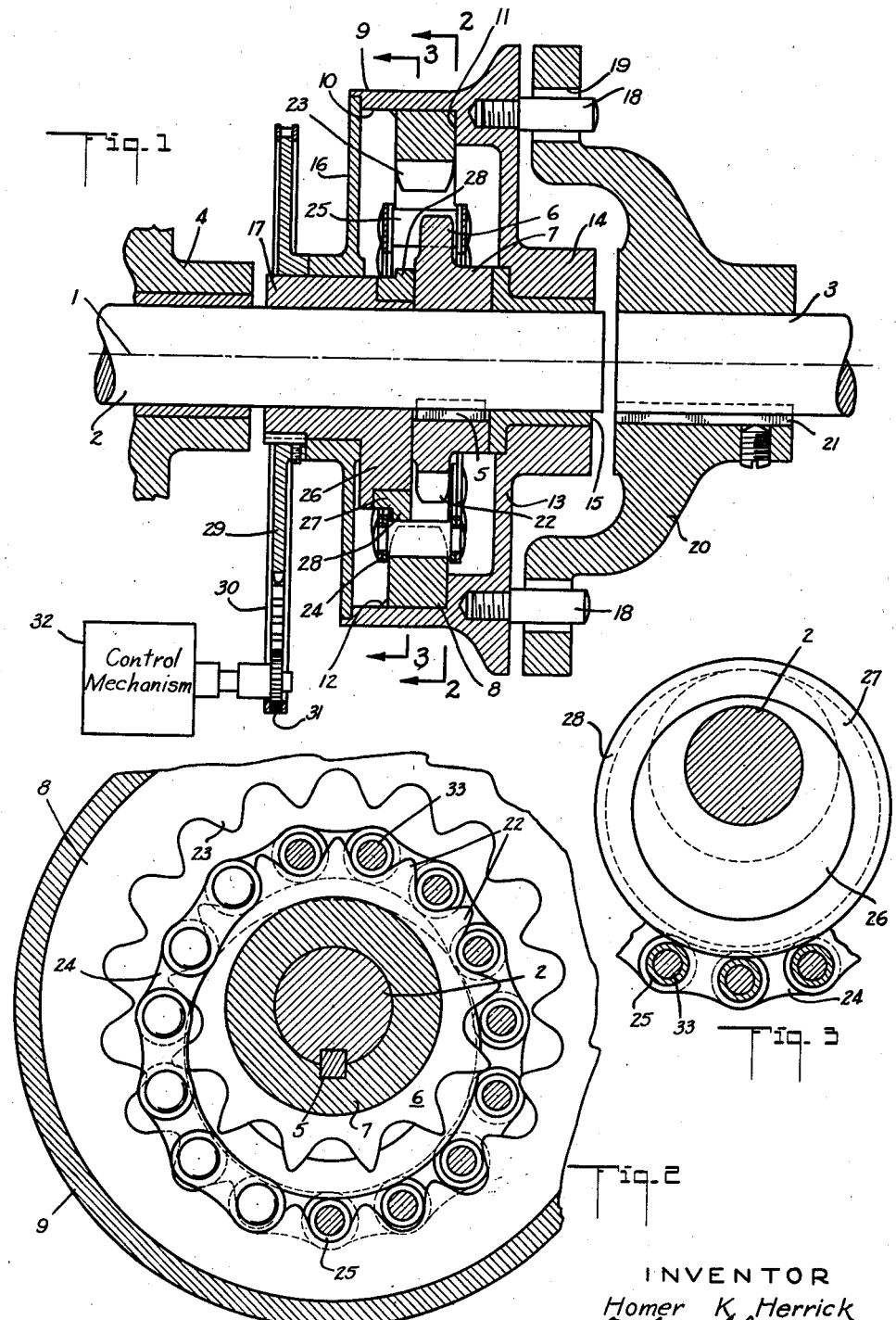

2,210,240

UNITED STATES PATENT OFFICE 2,210,240

VARIABLE TRANSMISSION MECHANISM

Homer K. Herrick, South Pasadena, Calif.

Application August 3, 1938, Serial No. 222,846

7 Claims. (Cl. 74—282)

This invention relates to a mechanism for transmitting motion from a driving shaft to a driven shaft; and especially to a device of this character that may be controlled to vary the ratio of the speeds between the driving and driven elements.

In one type of mechanism adapted to perform this function, it has been common to provide a set of wheels or gears arranged to add or subtract their motions, as by differential gear arrangements. Such devices, however, require considerable space. Also, it is necessary to provide additional elements to render it possible to arrange the driving and driven shafts coaxially.

It is one of the objects of this invention to provide a mechanism of this general character that is compact and yet that can be arranged for coaxial drive.

This result is obtained by providing a driving connection between two concentric wheels, one inside the other, that permits these wheels to be quite closely nested together, and yet permits a large ratio variation. It is accordingly another object of this invention to make it possible, by the aid of this interconnection, to provide a compact, effective drive at ratios variable within wide limits.

By so arranging the interconnecting member as a flexible loop, such as a sprocket chain, the highly desirable compactness can be readily attained. It is accordingly another object of this invention to make it possible to utilize such a flexible member in a differential gear mechanism of this character.

This invention possesses many other advantages, and has other objects which may be made more easily apparent from a consideration of one embodiment of the invention. For this purpose there is shown a form in the drawing accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

Figure 1 is a longitudinal sectional view of an apparatus incorporating the invention;

Figure 2 is a cross section taken along plane 2—2 of Figure 1, a portion of the flexible connection being shown in section; and Figure 3 is a fragmentary sectional view taken along plane 3—3 of Figure 1.

The transmission mechanism is shown as having an axis 1. The shaft 2 and the shaft 3, which may comprise respectively a driving and driven shaft, or vice versa, are coaxial with the axis 1. If we assume that shaft 2 is the driving shaft, it may be appropriately connected to be driven by a source of power and supported adjacent one end thereof as in the journal bearing structure 4. The driven shaft 3 may be connected to any appropriate load (not shown).

In order to transmit motion from one shaft to the other at a variable ratio, use is made of a pair of concentric wheel members, both of them having an axis coincident with axis 1. Thus fixed to shaft 2 as by the aid of the key 5, is an inner wheel member 6. This wheel member 6 has a hub 7 for providing a sufficiently large contacting surface between the wheel and the shaft 2. Arranged concentrically with the wheel member 6 is another wheel member 8. The outer periphery of the wheel 8 is shown as in contact with the inner surface 10 of a housing 9 and abutting a shoulder 11 thereon. The wheel member 8 may be securely attached within the housing member 9 as by the aid of welding, indicated at 12. The right hand end of the housing is closed by a flange 13 provided with a hub 14, which carries a journal bushing 15 mounted for free rotation on the right hand end of shaft 2. Thus the housing 9 is rotatably supported on the shaft 2. Its left hand end can be closed by a cover member 16 rabbetted into the left hand edge of the housing 9 and also rotatably mounted upon a member 17 concentric with the shaft 2.

The housing 9 is intended to be placed into driving relation with the driven shaft 3, as by a coupling. For this purpose it may be provided with a plurality of pins 18 arranged annularly about the axis 1 and adapted to engage in corresponding apertures 19 formed in a coupling member 20. This coupling member is shown as keyed to the driven shaft 3, as by the aid of the key 21.

By providing concentric wheel members 6 and 8 in compact arrangement, the drive between the shafts 2 and 3 is made coaxial, and little space is taken up by the transmission mechanism which is substantially entirely enclosed in the rotary housing 9.

In order to effect a driving relation between the wheel members, use is made of a connection capable of transmitting rotary forces from one wheel to the other. In order to transmit the torque from one to the other, the members 6 and 8 are shown respectively as provided with external teeth 22 and internal teeth 23. The connection between the wheels may be in the form of a rigid ring meshing with both sets of teeth; but in order to make it possible to reduce the over-all diameter of the apparatus, use is made of a flexible member such as a sprocket chain 24. This sprocket chain is shown as partially broken away in Figure 2. The sprocket pin bushings 25 through which pass the pins 33 that join the links in the chain, are shown as wide enough to engage the wide teeth 23 of the outer wheel member 8. The chain 24 encompasses the inner sprocket wheel 6, and is urged or maintained in operative relation with the teeth 23, in spite of the fact that the member 24 is flexible. This is accomplished by an eccentric mechanism.

Thus mounted for free angular motion about shaft 2 is the hub 17 carrying an eccentric 26. Mounted for free rotation on the eccentric is the ring 27. This ring 27 has a flange 28 adapted to engage the bushings or rollers 25. The ring 27 is arranged closely adjacent the sprocket wheel 6 for this purpose. By an inspection of Figure 2 it is seen that the eccentricity of the eccentric mechanism is such that the sprocket chain is kept in proper taut operative relation with both the inner wheel teeth 22 and the outer wheel teeth 23.

Rotation of either shaft 2 or 3 in either direction will transmit a rotational force through the eccentric mechanism and the chain 24 to the other shaft. It may readily be demonstrated that by appropriate control of the angular motion of the eccentric 26 about axis 1, the ratio of transmission may be correspondingly controlled. Thus in Figure 2, if we assume that there are "a" teeth 22 on wheel 6 and that there are "c" teeth 23 in the outer wheel 8, it may be readily demonstrated that for the shaft 3 to be rotated in unison with shaft 2, the eccentric mechanism must be rotated about axis 1 in unison with shaft 2. The member 24 then serves merely as a clutching member between shafts 2 and 3.

If the eccentric mechanism is maintained against any angular motion, the ratio of transmission from shaft 2 to shaft 3 is the same as the ratio of the teeth; that is, the wheel 8 is rotated in the ratio of $$\frac{a}{c}$$

with respect to the rate of rotation of the inner wheel 6. In general, the angular motion C of shaft 3 may be shown to be given by the relation:

$$C = A \cdot \frac{a}{c} + B \frac{(c-a)}{c}$$

where A is the angular motion of shaft 2, and B is the angular motion of eccentric 24. Now if it is desired to bring the rotation of the driven shaft 3 to zero, this can be accomplished by imparting to the eccentric mechanism an angular motion equal to $$A \cdot \frac{a}{c-a}$$

and in a direction reverse to that of the rotation of shaft 2. This follows immediately from an application of the general formula given above. To obtain other ratios of transmission, the angular motion B of the eccentric mechanism may be correspondingly controlled. In general, the larger the angular motion B is in a positive direction, the larger the resultant angular motion of shaft 3 is in this positive direction.

The means for controlling the rotation of the eccentric mechanism is illustrated in Figure 1 as comprising a sprocket wheel 29 keyed to the eccentric hub 17 and joined as by a sprocket chain 30 to a sprocket wheel 31 mounted on the control mechanism 32. This control mechanism may be a brake or source of motion, such as a motor, for determining the angular motion of the eccentric mechanism.

The transmission of power between shafts 2 and 3 may of course be the reverse of that specified; that is, the shaft 3 may be the driving shaft and the shaft 2 may be the driven shaft.

What is claimed is:

1. In a transmission mechanism, coaxial driving and driven shafts, a pair of coaxial inner and outer sprocket wheels, the inner wheel being fixed on one shaft, a housing surrounding said one shaft and rotatably supported thereon, the outer wheel being carried by said housing, a coupling between the housing and the other shaft, a sprocket chain passing around the inner wheel, and means urging said chain into driving connection with the outer wheel.

2. In a transmission mechanism, coaxial driving and driven shafts, a pair of coaxial inner and outer wheel members, the inner wheel member being fixed on one shaft, a housing surrounding said one shaft and rotatably supported thereon, the outer wheel member being carried by said housing, a coupling between the housing and the other shaft, a flexible loop connection passing around the inner wheel and in driving relation thereto, and means urging said connection into driving relation with the outer wheel member.

3. In a transmission mechanism, coaxial driving and driven shafts, a pair of coaxial inner and outer wheel members, the inner wheel member being fixed on one shaft, a housing surrounding said one shaft and rotatably supported thereon, the outer wheel member being carried by said housing, a coupling between the housing and the other shaft, a flexible loop connection passing around the inner wheel and in driving relation thereto, an eccentric mechanism mounted for angular movement about the common axis of the shafts for urging said loop connection into driving relation with the outer wheel member.

4. In a transmission mechanism, an inner and an outer sprocket wheel, said wheels being coaxial, the inner wheel having external teeth and the outer wheel having internal teeth, a chain in driving engagement with both wheels, and an eccentric mechanism having an axis of motion coaxial with the sprocket wheels for maintaining the chain in such driving engagement, said eccentric mechanism having a surface engaging the chain in tandem with the chain engaging surfaces of the inner sprocket wheel.

5. In a transmission mechanism, an inner and an outer sprocket wheel, said wheels being coaxial, the inner wheel having external teeth and the outer wheel having internal teeth, a chain in driving engagement with both wheels, and an eccentric mechanism having an axis of motion coaxial with the sprocket wheels for maintaining the chain in such driving engagement, said eccentric mechanism having a chain engaging surface, said chain being of sufficient width to accommodate simultaneously said chain engaging surface as well as the teeth of the inner sprocket wheel.

6. In a transmission mechanism, an inner and an outer sprocket wheel, said wheels being coaxial, the inner wheel having external teeth and the outer wheel having internal teeth, a chain in driving engagement with both wheels, and an eccentric mechanism having an axis of motion coaxial with the sprocket wheels for maintaining the chain in such driving engagement, the teeth on said outer sprocket being substantially wider than the teeth on the inner sprocket wheel.

7. In a transmission mechanism, an inner and an outer sprocket wheel, said wheels being coaxial, the inner wheel having external teeth and the outer wheel having internal teeth, a chain in driving engagement with both wheels, and an eccentric mechanism having an axis of motion coaxial with the sprocket wheels for maintaining the chain in such driving engagement, said eccentric mechanism having a surface engaging the chain in tandem with the chain engaging surfaces of one of said sprocket wheels.

HOMER K. HERRICK.